US008102299B2

(12) United States Patent
Young et al.

(10) Patent No.: US 8,102,299 B2
(45) Date of Patent: Jan. 24, 2012

(54) METHOD OF STRIP-MAP SYNTHETIC APERTURE RADAR AUTO-FOCUS PROCESSING

(75) Inventors: Stuart Young, Crawley (GB); Malcom Stevens, Crawley (GB)

(73) Assignee: Thales Holdings UK PLC (GB)

( * ) Notice: Subject to any disclaimer, the term of this patent is extended or adjusted under 35 U.S.C. 154(b) by 61 days.

(21) Appl. No.: 12/605,428

(22) Filed: Oct. 26, 2009

(65) Prior Publication Data

US 2010/0103028 A1 Apr. 29, 2010

(30) Foreign Application Priority Data

Oct. 24, 2008 (GB) .................................. 0819577.8

(51) Int. Cl.
*G01S 13/00* (2006.01)
(52) U.S. Cl. ................... 342/25 A; 342/25 R; 342/179
(58) Field of Classification Search ...................... 342/25
See application file for complete search history.

(56) References Cited

U.S. PATENT DOCUMENTS

| 4,924,229 | A | 5/1990 | Eichel |
| 6,046,695 | A | 4/2000 | Poehler |
| 6,781,541 | B1 * | 8/2004 | Cho .......................... 342/25 D |

OTHER PUBLICATIONS

Bonifant et al., "Interferometric height estimation of the seafloor via synthetic aperture sonar in the presence of motion errors," IEE Proceedings: Radar, Sonar & Navigation, Institution of Electrical Engineers, GB, vol. 147, No. 6, Dec. 1, 2000, pp. 322-330.

Knöpfle et al., "Mosaicking of digital elevation models derived by SAR interferometry," IAPRS, vol. 32, No. 4, 1998, pp. 306-313.
Koo et al., "A Comparison of Autofocus Algorithms for SAR Imagery," Progress in Electromagnetics Research Symposium 2005, Hangzhou China, Aug. 22-26, 2005, pp. 16-19.
W. G. Carrara, et al., "Spotlight Synthetic Aperture Radar: Signal Processing Algorithms", Artech House, Inc., 1995, pp. 246-260.
Turin, "An introduction to matched filters", IEEE Transactions on Information Theory vol. 6 Issue 3, Jun. 1960, pp. 311-329.
Press et al., "Numerical Recipes in C: the art of scientific computing, Second Edition", Cambridge University Press, 1966, pp. 497, 538-545.
Mancil et al., "A Map Drift Auto-focus Technique for Correcting High Order SAR Phase Errors", 27th Annual Tri-Services Radar Symposium Record, Monterey, CA, Jun. 23-25, 1981, pp. 391-400.
Extended European Search Report from European Patent Application No. 09252364.6, issued Feb. 26, 2010.

* cited by examiner

*Primary Examiner* — Timothy A Brainard
(74) *Attorney, Agent, or Firm* — Stroock & Stroock & Lavan LLP

(57) ABSTRACT

A strip-map Synthetic Aperture Radar (SAR) auto-focus image generation process is provided. Batches of raw radar return data are processed in order to form batch images which each have a valid region between invalid regions. The process determines an estimate of the first derivative of a phase error at an end of the valid region, determines a time-shift corresponding to that estimate and uses that information in determining a starting point for the next batch of raw radar return data.

19 Claims, 3 Drawing Sheets

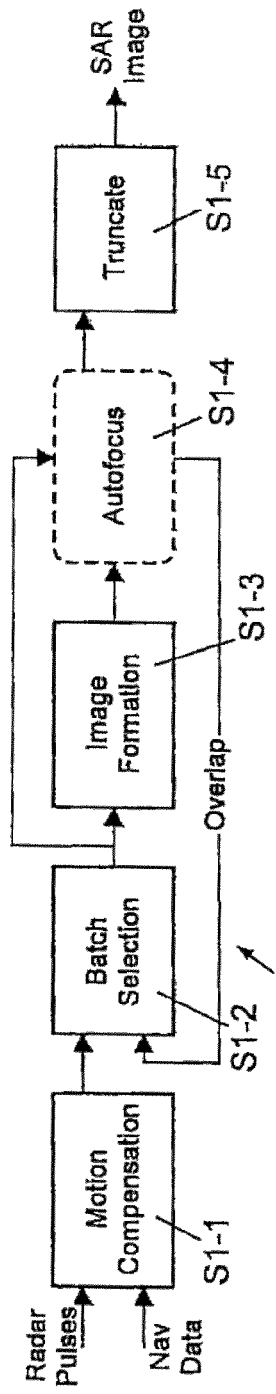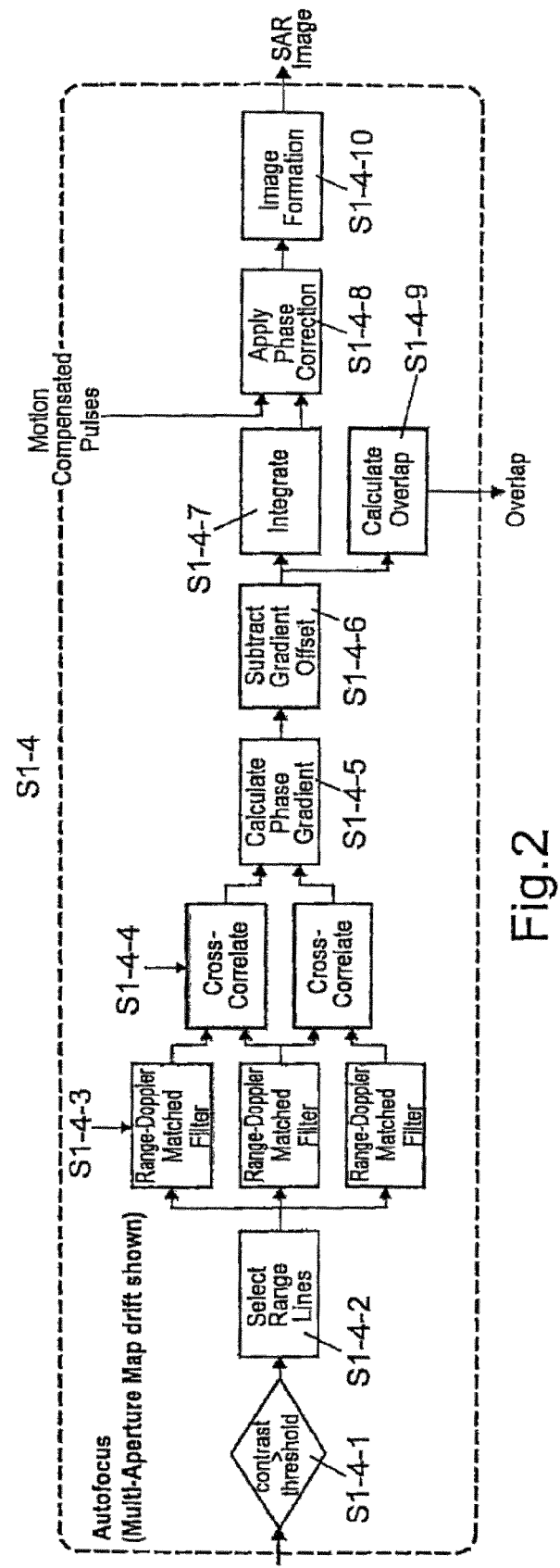

METHOD OF STRIP-MAP SYNTHETIC APERTURE RADAR AUTO-FOCUS PROCESSING

The present application claims priority to U.K. Patent Application Serial No. 0819577.8, filed on Oct. 24, 2008, the contents of which are hereby incorporated by reference in its entirety.

The present invention relates to strip-map synthetic aperture radar (SAR) auto-focus image generation by processing radar return data, including cases where return data is processed in batches and the resultant batch image data is abutted.

Strip-map synthetic aperture radar (SAR) with auto-focus image generation is a well-known technique in relating radar imagery with azimuth resolutions better than antenna beam-shapes would traditionally allow.

In order to process large images, raw radar return data is conventionally divided into batches to be processed separately. The batches of raw data are processed to form images which are concatenated, or abutted, in order of time or distance to form a larger strip-map image.

Auto-focus processing is applied to correct for various phase errors, which are well known to the skilled reader. Auto-focus uses characteristics of the data to correct for unknown phase errors. Conventional SAR image formation algorithms use expected range or phase, as this is proportional to range changes associated with a radar moving in a straight line relative to a point on the ground. Motion compensation can be used to correct for unwanted motion, assuming that a suitable navigation sensor is available, but this may still leave a residual error that can only be corrected using auto-focus.

As is also well known, conventional SAR autofocus techniques involve applying phase adjustment to correct a known phase variation, often approximated as a quadratic. This known phase variation is that expected for radar beams in cases where the radar platform is travelling at a constant speed along a line of constant height and distance from a strip of ground which includes a target. One such technique is described in the document by W. G. Carrara, et al., "Spotlight Synthetic Aperture Radar: Signal Processing Algorithms", Artech House, Inc., 1995, pp 246-260. In fact the skilled reader will observe that phase variations and errors are approximated in this document with a polynomial which has constant, linear and quadratic terms although these terms may be treated separately for simplicity. For example the auto-focussing may correct the quadratic term separately from a linear term Auto-focus cannot directly estimate a constant phase offset or linear phase changes. However, a series of quadratic or higher order errors from sections of the image may result in a phase offset or a linear phase change for part of the image.

As is well known, Stripmap SAR image formation can use a number of different methods to form an image. A matched filter is one known method. Applying a matched filter to batches can be achieved by convolution with a matched filter in a domain representing a time or distance traveled by the platform. Matched filters are described in the document by Turin, G. "An introduction to matched filters", IEEE Transactions on Information Theory Volume 6 Issue 3, June 1960, pp 311-329.

Alternatives to the matched filter method include the polar format algorithm or range migration algorithm, also known as omega-k algorithm.

Processing efficiency when using matched filters often dictates that the length of batches of radar return data (N), measured in time or distance, is significantly larger than the synthetic aperture (L).

Practical implementations of the matched filtering process are generally more efficient if performed in the frequency domain. Here, distance along an image may be related to time by the speed or velocity of the radar platform.

Processing of batches generally involves transforming data to the conjugate, or frequency, domain using a discrete Fourier transform technique, such as a fast Fourier transform (FFT). For practical reasons radar return data corresponding to different ranges are typically processed separately. Here, range refers to the distance from the radar to a target. The matched filter is unique for each range. Therefore processing data collected at different ranges requires that a different matched filter is calculated for each range cell. The matched filters can be stored in a matrix and the data all processed together if desired.

Transformed batch data is multiplied by the transform of a matched filter impulse response and the result is inverse transformed, as is well known to the skilled reader. Fourier transforms assume that the input signal is periodic, but this is not normally the case for real-world signals. Therefore convolution of two signals, when performed using Fourier transforms, will "pollute" part of the output with data that is wrongly assumed to wrap round. This results in a need to discard data at the end of an image corresponding to a batch of radar return data. Therefore, processed image batch image data has a valid region with invalid regions before and after. Forming a larger strip-map image from processed batches of raw radar return data involves overlapping and abutting regions of the images formed. This process may be most efficient if the overlapped regions correspond to the invalid regions.

Phase variations expected across a synthetic aperture for ideal, constant motion of the platform result from the relative motion of the radar compared with a stationary point.

If a target is directly broadside to the radar antenna on a moving platform, a portion of a beam from the antenna will return from the target perpendicular to the antenna. This portion of the beam will simply return in a time representative of the distance from the antenna to the target and will return at the same frequency as was propagated from the antenna. However, a portion of the antenna beam will return from a position ahead from the target. This portion will return in a time representative of the extra-distance traveled to that point and will return with positively Doppler-shifted frequency. Similarly, a portion of the beam will return from a point behind the target with a similarly increased return time and a negatively Doppler-shifted frequency proportional to the sine of the time for the radar return for an angle of half the azimuth. If the platform carrying the radar moves at a constant speed, height and distance from the target, or simply constant effective velocity, the relative motion of the radar and target cause a well-known expected quadratic phase variation across the synthetic aperture. However, if the platform deviates from the ideal path, errors will be introduced into the return time and frequency of data affected, and these will cause phase errors in the batch image.

As discussed herein motion of the platform is typically measured using a navigation sensor, and "unwanted" motion is corrected using motion compensation. However, the navigation sensor is not likely to be perfect. It will have a finite frequency response and also some measurement noise. Therefore a residual phase error typically remains.

An explanation of these effects is given in the document by C. E. Mancill and J. M. Swiger, "A Map Drift Auto-focus Technique for Correcting High Order SAR Phase Errors", 27th Annual Tri-Services Radar Symposium Record, Monterey, Calif., Jun. 23-25, 1981, pp 391-400. The technique described in C. E. Mancill et al corrects quadratic phase variations and outputs an estimate of the second derivative of the phase error based on correlations of sub-apertures of the batch image.

For simplicity, the phase variation expected for constant height, distance and speed of a radar platform will be referred to herein as a "phase variation" and the unexpected movement of the platform will be referred to as the "phase error". As is well understood by the skilled reader, across-track movement of the platform will introduce phase errors in the along-track direction.

Conventional auto-focus processes are used to estimate the phase errors. However, they may directly estimate other values and have to calculate the phase error from these values. The map-drift process estimates the second derivative of phase error and calculates the phase error by double integration.

From a review of W. G. Carrara at al, the skilled reader will recognise that the term "phase variation" and "phase error" are simplifications applied to SAR in order to aid understanding of the present invention. In fact, images will have phase errors which are conventionally approximated with a polynomial and thereby have constant, linear, quadratic and even higher order components. Non-ideal movement of the platform may also include high frequency vibrations. These cannot be linear piece-wise approximated.

Although techniques for processing strip-map SAR return data to form images and to concatenate or abut these images together are known, the problem of correctly concatenating or abutting the images together and managing the quality of auto-focussing applied is not trivial.

Conventional techniques for abutment for strip-map SAR auto-focused images, management of quality of auto-focussing and correction of phase errors rely upon correlating images at their edges or constraining the phase correction and in the first differential of corrected phase error at the edge of a batch.

The present invention provides a method of strip-map synthetic aperture radar auto-focus image generation, comprising processing radar return data in batches, said data and batches having an order in a chronological domain, each batch image having a valid region abutted to valid regions of other batch images and overlap regions overlapped with overlap regions of other batch images, the method further comprising: determining an estimate of a first derivative of a phase error in a batch image substantially at an end of the valid region; determining a chronological shift corresponding to said first derivative at the end of the valid region; and determining the start of the next batch of radar return data dependent on said chronological shift.

Embodiments of the present invention use an estimate of the first derivative of phase error at the edges of a valid region of an auto-focused batch image to compensate for chronological shifts occurring in auto-focussing of radar return data for strip-map SAR auto-focus image generation. The process comprises processing radar return data in batches in order and abutting the resulting batch images and comprising determining the first derivative of the phase error at the edge of a batch image and using that first derivative in subsequent processing.

These processes may provide improved abutment of batch images using knowledge of the first derivative of phase errors at the edges of batch images.

The method of strip-map synthetic aperture radar auto-focus image generation may comprise processing radar return data in batches in an order and abutting the resulting batch images and comprising determining an estimate of the first derivative of the phase error in batch images and using this first derivative of the phase error at a position corresponding to an edge of a valid region of a batch image to determine a corresponding chronological shift according to the time shift theorem and using this chronological shift to determine the appropriate position for the start of the next batch of raw radar return data. The appropriate position may also be determined such that the image resulting abutted valid regions is contiguous.

The use of the terms "chronological" and "time" herein assumes a relation between distance traveled by a radar platform and the time taken for that distance to be covered. Similarly, the use of the term "frequency" and "Fourier transformed domain" refer to the conjugate of "time", "chronology" or similar as occurs when a Fourier transform is performed.

These aspects account for chronological shifts resulting during auto-focus processing where the time shift which results from a non-zero first derivative of phase errors, and allow more accurate selection of raw radar return data for subsequent batches.

The method of strip-map synthetic aperture radar auto-focus image generation may comprise processing radar return data in batches in an order and abutting the resulting batch images and comprising determining an estimated first derivative of the phase error at the end of a valid region of a batch image and subtracting the first derivative from estimated first derivative phase errors for subsequent batch image data.

These processes match the first derivative of phase error at the edges of abutted batch images so that phase correction applied by auto-focus processing has zero first derivative at the start of a valid area of each batch and, therefore, ensures that this position is not shifted in the final image. This is, the start of the valid region is not shifted and therefore can be abutted more accurately to the previous batch image.

The method of strip-map synthetic aperture radar auto-focus image generation may involve processing raw radar return data and abutting the resulting batch images, the method comprising generating images from raw return data and subsequently applying auto-focussing to said images, and evaluating each image after auto-focus processing against each corresponding image before auto-focus processing and rejecting the image after auto-focus processing for the image before image processing if the improvement in the image caused by auto-focus processing does not meet a predetermined criterion.

These aspects allow management of the auto-focus processing to reject the effect of the auto-focus processing where it would have a negative impact on the overall image quality.

The method may comprise applying a Fourier transform whereby said time-shift theorem relates a constant rate of change of phase in the Fourier transformed domain to a chronological shift.

The method may comprise applying auto-focus phase shifts.

The method may comprise subtracting the estimated first derivative of the phase error at the end of a valid region of a given batch image from an estimate of a first derivative of phase errors for one a subsequent batch image.

The method may comprise subtracting the phase error at the start of the valid of a first batch image from phase errors for the rest of said valid region.

The overlap regions may correspond to invalid regions generated by a matched filter process.

The method may comprise determining an estimated second derivative of the phase error and integrating said estimated second derivative to find said estimated first derivative.

The method may comprise auto-focus processing to provide an auto-focus batch image from a non-auto-focused batch image.

The method may comprise comparing an auto-focused image with a corresponding non-auto-focused batch image, rejecting said auto-focused batch image if said comparison reveals an improvement in the batch image below a predetermined threshold.

The method may comprise abutting said corresponding non auto-focused batch image in place of the corresponding auto-focused batch image in the event that said auto-focused images is rejected.

The method may comprise applying multiple iterations of auto-focus processing and accumulating said estimate of the first derivative.

The method may comprise determining an estimated second derivative of phase errors and integrating to find estimated first derivatives of phase errors.

The method may comprise applying an integrity evaluation for the second derivative, said integrity evaluation based on energy in the raw radar return data contributing to said second derivative.

The method may comprise applying acceptability evaluations to batches of raw radar return data prior to processing said batches.

The acceptability evaluations may comprise comparing a contrast value for pixels in the raw data with a threshold.

The invention is illustrated below by describing specific embodiments relating to the well known "map-drift" process. Alternatives to the map-draft process known to the skilled reader may be used with alternative specific embodiments of the invention.

FIG. 1 depicts the processing of overlapping batches of raw radar return data according to a specific embodiment of the present invention;

FIG. 2 depicts an auto-focus process performed by the specific embodiment of FIG. 1;

Figure 3:
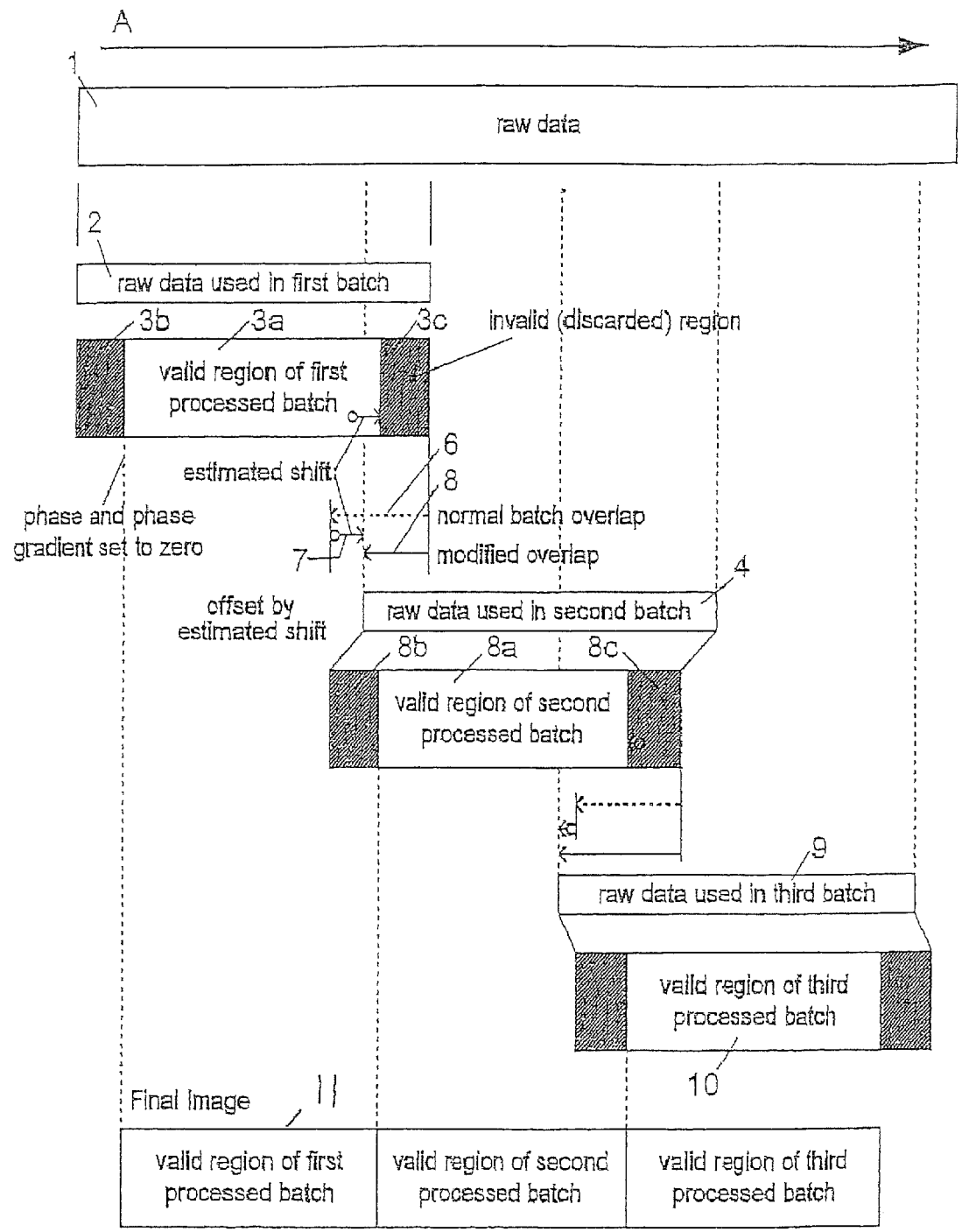
Figure 4:
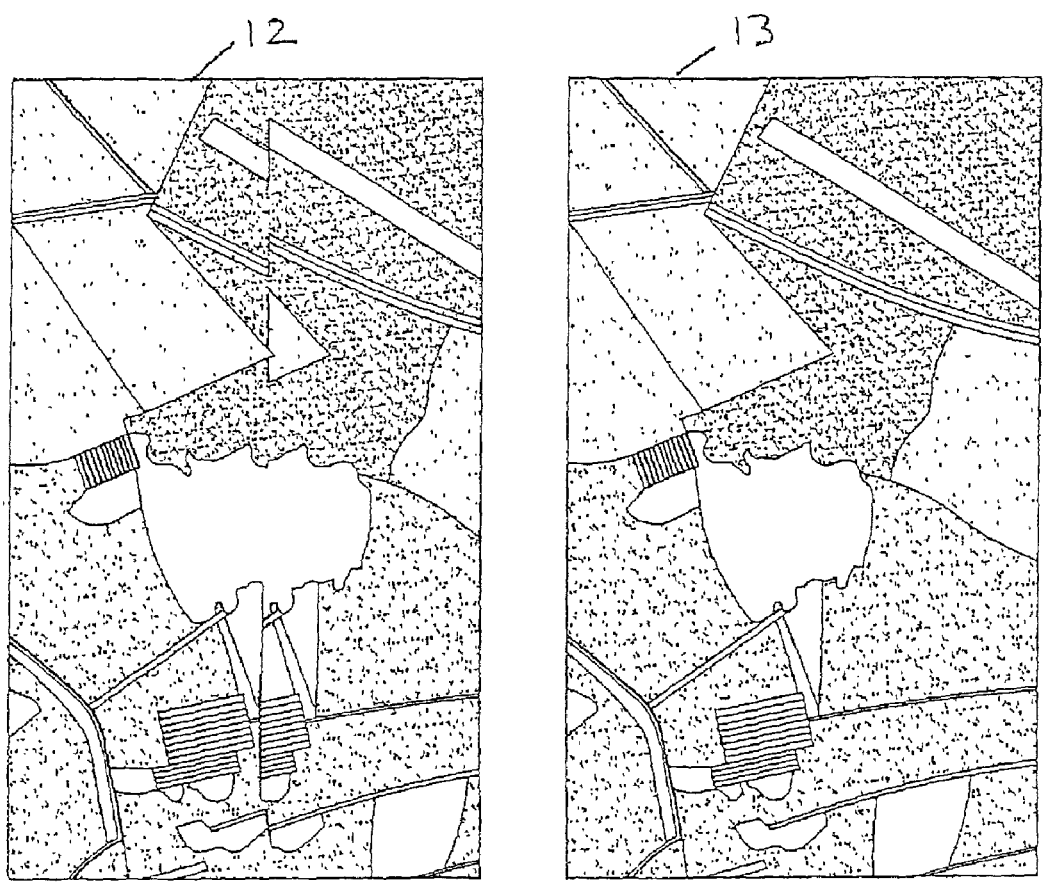

FIG. 3 depicts the relationship of overlapping batches of raw radar return data, batch images and an image formed from the batch images according to the specific embodiment of FIGS. 1 and 2; and FIG. 4 shows an actual image generated by an embodiment of the invention, on the right hand side, compared with an image, on the left hand side, of the same scene but processed with constant overlap instead of variable overlap of batch data.

FIG. 1 depicts a process S-1 of strip-map SAR auto-focus image generation according to a specific embodiment of the present invention involving overlapping batches of raw data and removal of invalid regions before assembling a final strip-map image.

Motion compensation adjustments are made in the "motion compensation" process S1-1. These adjustments involve applying piece-wise linear approximations to the ideal motion compensation.

Navigation sensors typically sample data at a different rate from that at which the radar transmits pulses (Pulse Repetition Frequency or PRF), therefore the motion corrections must be interpolated to the PRF before the corrections can be applied.

Ideal motion correction would take curvature of the earth into account. However, the curvature of the earth can be considered negligible over short distances allowing the use a straight-line approximation. But for very long strip-map images the curvature would become significant therefore each straight-line is in a slightly different direction from the previous one. Therefore, the errors can be maintained at a suitable level and not allowed to accumulate over large images.

The motion compensation process S1-1 receives radar pulses and navigation data. The process S1-1 describes movement of the platform along-track and provides raw radar return data. The motion compensation process S1-1 calculates the deviation of the radar from a desired track from the navigation data, calculates phase corrections from these deviations, and applies these to the radar return data.

Both the motion-corrected data, being radar return data with motion corrections applied, and the SAR image formed directly from this data are passed to an auto-focus process S1-4.

A batch selection process S1-2 receives raw radar return data. This receives motion-corrected data Selections of batches of data are made according to parameters of an image formation process S-1-3. Any suitable parameters known to the skilled reader may be applied. The selections of batches are also made according to adjustments provided by an auto-focus process S1-4.

The image formation process S1-3 is applied to the batches of raw radar return data to form batch images. Any suitable image formation process known to the skilled reader may be used.

The auto-focus process S1-4 is applied to the batch images. The expected phase variations are used in the image formation stage to form the image.

The auto-focus process S1-4 of the specific embodiment of the present invention receives the batch images along with a batch of motion compensated data provided by the motion compensation process S1-1. The auto-focus process S1-4 estimates phase corrections from the SAR image and applies these corrections to the motion-corrected data and subsequently forms a corrected image from this data Formation of this second image involves a Fourier transform. A linear rate of change of phase, or a constant derivative, in the transformed domain results in a time or along track shift for the data.

The auto-focus process S1-4 outputs auto-focused batch images. The process S1-4 also outputs an adjustment used by the batch selection process S1-2 to adjust the overlap of batches of raw radar return data used for given batch images.

A truncation process S-1-5 removes invalid regions of the auto-focused batch images. These truncated auto-focused images are then abutted or concatenated (by processes not depicted) to form a strip-map SAR image. Any suitable abutment process known to the skilled reader may be used for this specific embodiment.

The image formation process S1-3 of the specific embodiment described herein involves performing a convolution with a batch filter. As is known to the skilled reader this processing involves "compression" of the finite Azimuth of a radar beam to generate images with a resolution which is better than radar beam divergence would suggest. Various matched filter operations known to the skilled reader may be applied, although the present invention applies a method given in the document by Turin, G.

Convolution with a matched filter is applied in the frequency domain. The invention will be described herein with reference to time as the chronological domain, although it will be understood by the skilled reader that time is related to distance by the speed and velocity of the platform on which the radar is mounted. The conjugate domain to time is frequency and so the filter is implemented in the frequency domain using fast Fourier transform (FFT). Any suitable discrete Fourier transform known to the skilled reader may be used, although the present embodiment applies a fast Fourier transform such as described in the document by W. H. Press et al., "Numerical Recipes in C: the art of scientific computing, Second Edition", Cambridge University Press, 1966, p 538-545 in the batch selection process.

Image formation can be viewed as a transverse filtering operation with a finite impulse response filter having a length equal to the synthetic aperture length (L) of the SAR. Here, the length of the filter is equal to the synthetic aperture length. The along-track sample spacing relates this distance to be converted to a number of along-track samples.

This convolution process results in valid and invalid regions and results in the need for the batch to overlap. In alternative embodiments of the present invention the matched filter convolution process could be replaced with a "spotlight" SAR image formation algorithm also known to the skilled reader. This would not have "valid and invalid" regions, but would still need to overlap to ensure a continuous strip, or a contiguous image is formed.

The batch selection process S1-2 determines a suitable overlap. According to this specific embodiment of the present invention, the overlap depends only on the size of the invalid region because the invalid region relates to processing which has not resulted in a valid image that can be used in the finally abutted image. The region of overlap of the raw radar return data needs to be reprocessed to ensure that the valid regions result in a continuous abutted image. It will be apparent to the skilled reader that the overlap does not necessarily need to correspond to the invalid region. In this specific embodiment of the present invention the batch selection process also adjusts the overlap of batches according to information determined during the auto-focus process S1-4.

The length (N) of the filter is determined by the length of the synthetic aperture L. Here, the length L is the distance that must be flown by the radar platform in order to achieve a specified resolution. This is defined by the equation:

$$\text{Aperture } L = \frac{R_{far} \cdot \lambda}{2 \cdot \rho_{CR}} \qquad \text{Equation 1}$$

where L is the length of the SAR aperture in meters, $R_{far}$ is the slant range in meters from the radar to the far edge of the imaged area, $\lambda$ is the wavelength of the transmitted signal based on sent frequency and $\rho_{CR}$ is the desired cross-range resolution. As is known by the skilled reader, the cross-range sample spacing is the distance, or time, between successive pulses transmitted by the radar. Typically, the radar emits a Pulse Repetition Frequency (PRF) of the order of kHz, perhaps one or two kHz for an airborne SAR. This order of PRF gives a cross-range, along-track, sample spacing of 1 or 0.5 ms, respectively, in time.

FIG. 1 shows a feed-forward to the auto-focus S-1-4. The samples must be spaced along the track by less than the final cross-range resolution of the SAR, typically of the order of a meter for a swath SAR of the type described herein.

The samples must be spaced along track by less than the final cross-range resolution, since weighting will broaden the resolution.

The resolution may be smaller or an order of magnitude larger than a meter and the algorithm would still be valid.

As discussed herein, an overlap of batch images is important to ensure that the image is contiguous.

An offset to the start of the valid data within a batch is given by:

$$\text{offset}_{CR} = \frac{R_{far} \cdot \lambda}{4 \cdot \rho_{CR} \cdot \delta_{CR}} \qquad \text{Equation 2}$$

The overlap between batches is equal to the length needed to ensure that the valid data is contiguous after the invalid data has been removed and as given by:

$$\text{overlap}_{CR} = \frac{R_{far} \cdot \lambda}{2 \cdot \rho_{CR} \cdot \delta_{CR}} \qquad \text{Equation 3}$$

The length of the valid region is given by:

$$\text{valid}_{CR} = \text{batch}_{CR} - \frac{R_{far} \cdot \lambda}{2 \cdot \rho_{CR} \cdot \delta_{CR}} \qquad \text{Equation 4}$$

The above $\delta_{CR}$ is the cross-range sample-spacing. If data is processed at the PRF, the cross-range sample-spacing is equal to the distance traveled between transmission of sequential pulses, although the data may be down-sampled before SAR processing in this specific embodiment.

The motion compensation process S1-1 of this specific embodiment is a phase correction of each successive along-track sample position. The same correction may be given to the returns at all ranges. However, with enough processing power, it may be better to calculate different corrections at each range and also to interpolate the range samples to correct for two-dimensional motion of the aircraft. The third dimension may be corrected by adjusting the timing of the pulse, or by interpolation between pulses.

As discussed herein, cross-track motion over the whole of the strip-map SAR image will in general constitute a quadratic, or higher, phase variation that will defocus the image and introduce position errors. The auto-focus process S1-4 assumes that motion error over any small section of the image can be approximated as a constant cross-track velocity, or by a linear rate of change of phase.

For broadside imaging, motion directly towards, or away from, the area being imaged if uncorrected will result in range errors and cross-range, or along-track, defocusing. Motion perpendicular to this and perpendicular to the along track direction result in cross-range defocusing and also a cross-range displacement.

The auto-focus process S1-4 applied to each batch involves estimating phase adjustments using a conventional multi-aperture map-drift auto-focus technique known to the skilled reader. Examples of suitable techniques are given in the document by C. E. Mancill et al; and W. G. Carrara, et al.

In this specific embodiment each batch image is evaluated before the auto-focus process S1-4 is applied. This ensures that there is sufficient information within the batch image to make attempting the auto-focus worthwhile. The assessment compares the average contrast per pixel of the batch image against a threshold. The auto-focus process S1-4 is only applied if the contrast exceeds the threshold.

The auto-focus uses lines of the image data, to speed up the estimation process, although there is no reason why the whole batch could not be used. However, the auto-focus correction must be applied to the whole of the batch of motion compensated data so that the corrected image may be formed subsequently.

Only a portion of lines of the batch image is selected for auto-focussing, as is conventional for auto-focus processes, and is described in the document by W. G. Garrera, et al.

The map-drift process estimates the second derivative of the phase error in the batch image. This is a basic output of the map-drift auto-focus process. Any suitable alternatives to the map-drift auto-focus process will need to output this second differential if it is desired to censor this data based on amplitude. Otherwise correcting the overlap of batches requires only the first derivative.

The estimate of the second differential of phase error is evaluated for integrity. This evaluation is based on the energy in the data contributing to a particular error estimate. A simple threshold is used to ensure that the data contributing to this estimate has a significantly high signal-to-noise ratio and therefore the estimate is not likely to have been significantly affected by thermal noise.

Once the integrity evaluation has been performed, the estimates of the second-differential of phase error are integrated to produce an estimate of the first derivative of the phase error, or the first differential of the phase error.

Next, the first derivative of the phase error is determined for the end of the overlapping region, or the start of the valid data. The end of the overlapping region will be offset by $offset_{CR}$ given by Equation 2. Once determined, this first derivative is subtracted from the estimates from the integrated estimate of the second derivative for the rest of the batch image. This adjustment ensures that the phase correction has zero first derivative at the start of the valid area of each batch image.

Next, the first derivative of the phase error is integrated for a second time to determine phase corrections to be applied to motion-compensated SAR data in the data.

According to the Fourier transform time-shifting theorem, a constant first derivative of a phase processed in the frequency domain will result in a time shift, or chronological shift, in the time domain. Here, the frequency is the conjugate domain for time.

Strip-map SAR auto-focus processing conventionally involves processing raw data to generate an image and then applying auto-focus processing to those images to correct the expected phase variations and phase errors. This process naturally involves selection of batches of raw radar return data from which to process. The present invention was concerned with auto-focus processing and also a selection of batches of raw radar return data.

As is well known to the skilled reader auto-focussing involves selection of range lines, applying range-Doppler matched filters, cross-correlating image data, calculating phase derivatives and gradients, integrating those phase gradients to find phase corrections and forming an auto-focused image by applying those phase corrections. Also conventionally, the phase corrections applied involve applying motion compensation. The present invention is not concerned with the implementation of these specific conventional processes and any suitable such processes known to the skilled reader can be used in putting the present invention into practice.

The estimated first derivative of phase errors at the end of the overlapping region, i.e. at $offset_{CR}$, is determined and this first derivative is subtracted from estimates of gradients from this point onwards. Batch image data before this point is not altered because it has already been completed in the previous batch. Next, the estimated first derivative of phase error is integrated for a second time to produce phase corrections that are applied to motion-compensated batch images.

This adjustment of phase ensures that the phase correction has zero first derivative at the start of the valid area of each batch image and therefore this position is not shifted in the final strip-map image.

Phase adjustment is applied to the batches of motion compensated radar return data. A new image is then formed from this auto-focus corrected batch. Forming this image involves a Fourier transform and therefore a time-shift or chronological shift, in accordance with the time shift theorem, is introduced.

This question does not arise in the process of adjusting the offset because that relates to selection of raw data which must subsequently be processed by Fourier transform and so a shift occurring during that transform could be predicted.

Corrections from each iteration of the auto-focus process S1-4 are accumulated with all of the corrections from the previous iterations before being applied to correct the SAR batch image.

Auto-focus phase corrections may result in across-range shifts within the batch image. Therefore, the magnitude of the shifts that result are calculated in the location within the original data as identified that would be shifted to the end of the valid region. This involves determining the time shift resulting from the derivative of phase error and providing adjustments for the batch selection process S1-2 to account for the time-shift corresponding to the phase derivative. In particular, the estimated first derivative of phase shift at the end of the valid region is used to determine the time-shift which must be applied to selection of the batch of radar return data to be used by the batch selection process 3 to be used by the image formation process S1-3.

The relationship between a constant first derivative of phase error in the frequency domain and shift in time is well known to the skilled reader and results from application of the Fourier transform time-shift theorem as given in the document by W. H. Press et al., "Numerical Recipes in C: the art of scientific computing, Second Edition", Cambridge University Press, 1996, p 497. The magnitude of this shift, is added to the standard overlap, given by Equation 3, with the subsequent batch. This ensures that the image formation process user data that is in the main-lobe of the radar antenna and the data selected for the next batch will line up with the output from the current batch.

The new overlap is given by:

$$overlap_{CR} = \frac{R_{far} \cdot \lambda}{2 \cdot \rho_{CR} \cdot \delta_{CR}} + af_{adjustment} \qquad \text{Equation 5}$$

where $af_{adjustment}$ is the additional time-shift determined for the given phase. A comparison of image contrast is made to ensure that the improvement in the quality of the image involves a given threshold.

The skilled reader will already be familiar with the effect of adding a phase ramp in the frequency domain and can therefore calculate the shift that this would produce and therefore the offset that needs to be applied.

If the auto-focus image is rejected then the original image and the standard overlap between batches, given by Equation 3, are used instead of the auto-focus batch image and the overlap including the Fourier transform time-shift determined during the auto-focus process S1-4.

Next, the invalid (overlapped) data is removed from the batch image by the truncation process 6 and the image is abutted to previous batch images, in a process not depicted.

As apparent from Equation 4, the number of valid samples is typically constant. The size of the invalid region is related to the size of the matched filter and the size of a batch is constant. So long as nothing contributing to the matched filter size changes then the number of valid samples is constant. The most likely thing to change is the range to the image area, as motion compensation is continually required to correct this too. As long as the range from the radar to the image location has not significantly changed then, again, the number of valid examples will be constant.

FIG. 2 depicts the auto-focus process S1-4 of FIG. 1.

The first process S1-4-1 in the auto-focus process is a comparison of the contrast of the batch image against the threshold. This evaluation is applied to each batch image prior to applying auto-focussing. This ensures that there is sufficient information within the batch image to make attempting the auto-focus worthwhile. In this specific embodiment, the evaluation compares the average contrast per pixel against a threshold. auto-focussing is only applied if the contrast exceeds the threshold. Suitable alternative evaluations known to the skilled reader may be used as alternatives.

The next process S1-4-2 selects lines of constant range to be processed separately. To reduce processing load, only a small number of the lines at given ranges are selected for auto-focussing. Any suitable technique for doing this known to the skilled reader may be used.

The next process S1-4-3 applies matched filters as discussed herein. These matched filters are based on the image formation matched filters. The difference is that they split the phase response into sections. This is described in the map-drift paper by Mancill et al.

As will be apparent to the skilled reader there is another image formation stage that must take place once the data is corrected. As this is only required if auto-focus is being applied, it may considered to be part of the auto-focus processing and is depicted as step S-1-9, as discussed herein.

The next process S1-4-4 correlates sections of the batch image, again using the standard map-drift technique. This process determines a quadratic phase variation and also determines an estimated second derivative of the phase error.

The next process S1-4-5 is a departure from the conventional map-drift technique and involves evaluating integrity of the estimated second derivative based on the energy in the data contributing to a particular error estimate A simple threshold is used to ensure that the data contributing to this estimate has a sufficiently high signal-to-noise ratio and therefore that the estimate is not likely to have been significantly effected by thermal noise.

Process S1-4-5 also integrates the estimate of the second derivative to determine an estimate of the first derivative and, in particular the estimate of the first derivative corresponding to the end of a valid region of a batch image.

At process S1-4-6 the estimate of the first derivative at the end of the valid region of a batch image is subtracted from the next batch image. If the batch image is the first batch image in the strip-map then the start of the image, at the edge of the valid region, will be set to zero and the adjustment needed to do that will be subtracted from the rest of the batch into the valid region of the batch image.

In the next process S1-4-7 the estimates of the first derivative of a phase error is integrated, for a second time, to produce phase corrections to be applied in a conventional map-drift phase correction process in the next process S1-4-8. The motion compensation has already been applied in the motion compensation step S1-1. It is this data to which has the auto-focus phase correction is applied.

Multiple iterations of the auto-focus processes may be performed until either a fixed number of iterations are performed or the change in the estimated error falls below a threshold. As will be apparent to the skilled reader this could be depicted by a loop (not shown) in the process S-1.

The phase corrections from each iteration are accumulated (in a process not depicted). According to this accumulation each iteration of the auto-focus S-1-4 outputs a vector of values, the second differential of phase. These vectors are added together and the integration stages repeated.

At process S1-4-9 the accumulated estimate of the first derivative of phase error is used to calculate a chronological shift, or time shift, according to the Fourier transform time-shift theorem as explained by W. H. Press et al. This shift is used as an adjustment for the overlap of raw radar return data batches given in Equation 3. The adjustment, $af_{adjustment}$, is added to the overlap$_{CR}$ to align the batches of raw radar return data with the valid region after auto-focussing has been applied.

The magnitude of the $af_{adjustment}$ is added to the overlap found according to parameters of the matched filter used in the Image formation process S1-3 according to:

$$overlap._{CR} = \frac{R_{far} \cdot \lambda}{2 \cdot \rho_{CR} \cdot \delta_{CR}} + af_{adjustment}. \qquad \text{Equation 5}$$

In practice, this ensures that processing of raw radar return data in the image formation process S1-3 uses raw radar return data corresponding to the main lobe of the antenna and that a data selected for the next batch will line up with the current auto-focused batch image.

The auto-focus process S1-4 also includes a process (not depicted) which performs a comparison of the auto-focus batch image contrast against the batch image before auto-focussing. This process determines whether the image quality has improved above a given threshold.

The auto-focused result is rejected if the contrast has not increased sufficiently as a result of the auto-focus process S1-4. If the auto-focused batch image is rejected, the batch image prior to auto-focussing is abutted in place of the auto-focused image and the standard overlap given by Equation 3 is used. This is, the $af_{adjustment}$ is rejected also.

In the next process S1-5, FIG. 1, and S1-4-9, FIG. 2, the auto-focused batch image is truncated to remove the invalid regions and the valid regions are abutted to form a strip-map image.

Specific embodiments of the present are further illustrated by reference to FIG. 3 which depicts the relationship of raw data, batch images, overlaps and abutment of valid regions of batch images.

Raw radar return data 1 extends in a chronological order depicted by A. In this specific embodiment the chronological order is in the time domain, which is related to distance by the speed of the platform on which the radar is mounted.

A first batch of raw radar return data 1 is selected from raw radar return data 2 and processed to obtain the batch image 3. The batch image 3 has a valid region 3a and invalid regions 3b and 3c. The batch images are eventually truncated to remove the invalid or overlap regions 3b and 3c.

An estimate of the second derivative of the phase error is provided as an output of the processing to obtain the batch image 3 from the batch raw radar return data 2. Here 'phase error' refers to phase deviations estimated by the auto-focus process S1-4.

In order to add this to the number calculated by equation 3, it must be a number of samples.

An estimate of the first derivative of the phase error is determined by integration. This phase error is set to zero at the start of the valid region 3a.

A second batch of raw radar return data 4 is then selected. The start of second batch 4 is determined by the end of the invalid region of the batch image 3, minus a conventional map-drift overlap 6 given by Equation 3, and plus the $af_{adjustment}$, which is the estimated shift made according to the Fourier transform time-shift theorem. The conventional overlap 6 and the estimated shift 7 combine to give a modified overlap 8 as given by Equation 5. The shift is calculated as a number of samples by which to offset the overlap. It is equivalent to a distance, if multiplied by the along-track sample spacing, and therefore could be related to a time if divided by the along-track component of velocity.

The second batch 4 of raw radar return data is then processed to obtain the batch image 8, with valid region 8a, and invalid regions 8b and 8c. The process is repeated for a third batch 9 of selected from the raw radar return data 1 to obtain a third batch image 10. The final strip-map image 11 is obtained by discarding invalid regions to abutting the valid batch images 22a, 28a and 30a in chronological order.

FIG. 4 shows a portion of a strip-map SAR auto-focused image which has no overlap, or abutment adjustment on the left 12 and abutment adjustment according to a specific embodiment of the invention on the right 13. The left image 12 shows discontinuities arising from chronological shifting.

Specific embodiments of the present invention are implemented using any suitable computer processing means with suitable peripheral hardware known to the skilled reader.

Further specific embodiments may comprise a carrier encoded with computer or processor readable encoded instructions. The instructions when executed configure the computer or processor to perform the processes described according to the specific embodiment described herein or to control a strip-map SAR auto-focus apparatus to perform the method. The instructions when executed by a computer with suitable peripheral hardware may configure a device to perform the processes described herein. The instructions may be in a hardware description language.

Specific embodiments performed on a computer or processor involve hardware specific steps, including the storing on volatile and non-volatile memory data relating to first and second derivatives chronological shifts, and other parameters and values mentioned herein and radar return data and image data. These steps may also include applying search, ordering and data look-up algorithms to, for example, to determine data for estimates of the first derivative of phase corresponding to points along the valid image data.

Other specific embodiments of the present invention comprise a strip-map SAR with auto-focussing which performs the processes described herein.

Further specific embodiments comprise a vehicle, such as an aeroplane, which carries a strip-map SAR and/or computer processor configured to carry out processes as described herein with reference to specific embodiments.

The reader will appreciate that the foregoing is but one example of implementation of the present invention, and that further aspects, features, variations and advantages may arise from using the invention in different embodiments. The scope of protection is intended to be provided by the claims appended hereto, which are to be interpreted in the light of the description with reference to the drawings and not to be limited thereby.

The invention claimed is:

1. A method of strip-map synthetic aperture radar autofocus image generation, comprising the steps of:
    forming, by an image processing circuit, one or more batch images from batches of radar return data, said radar return data and batches of radar return data having a chronological order, wherein at least one batch image has a valid region abutted to a valid region of another batch image and an overlap region overlapped with the valid region of another batch image, the valid region of the one or another batch image being the portion of the batch image that is used to form a final strip-map image;
    for one or more batches of radar return data, performing the steps of:
        determining, by an image analysis circuit, an estimated first derivative of a phase error in a batch image, substantially at an end of the valid region;
        determining, by a time analysis circuit, a chronological shift corresponding to said first derivative at an end of the valid region; and
        determining, by a triggering circuit, a start of a next batch of radar return data dependent on said chronological shift.

2. The method according to claim 1, wherein the step of determining a start of a next batch of radar return data comprises:
    determining the start of the next batch of radar return data corresponding to an end of a previous batch of raw radar return data; and
    adjusting said start of the next batch dependent on said chronological shift.

3. The method according to claim 2, further comprising determining the start of the next batch of data such that valid regions of connected batch images form a contiguous image.

4. The method according to claim 1, further comprising applying a Fourier transform to the batch image and determining a chronological shift corresponding to a linear rate of change in a Fourier transformed domain according to a time-shift process.

5. The method according to claim 1, further comprising subtracting the estimated first derivative of the phase error at the end of a valid region of a predetermined batch image from an estimated first derivative of phase errors for a subsequent batch image.

6. The method according to claim 1, further comprising subtracting a phase error at a start of a valid region of a first batch image from phase errors for a rest of said valid region.

7. The method according to claim 1, wherein the overlap regions correspond to invalid regions generated by a matched filter process.

8. The method according to claim 1, further comprising determining an estimated second derivative of the phase error and integrating said estimated second derivative to find said estimated first derivative.

9. The method according to claim 1, wherein said processing comprises auto-focus processing to provide an auto-focus batch image from a non-auto-focused batch image.

10. The method according to claim 9, further comprising comparing an auto-focused batch image with a corresponding non-auto-focused batch image, and rejecting said auto-focused batch image if said comparison reveals an improvement in the auto-focused batch image below a predetermined threshold.

11. The method according to claim 10, further comprising abutting a non-auto-focused batch image in place of the corresponding auto-focused batch image if said auto-focused batch images is rejected.

12. The method according to claim 9, further comprising applying multiple iterations of autofocus processing while accumulating said estimated first derivative.

13. The method according to claim 1, further comprising applying an integrity evaluation for the second derivative, said integrity evaluation based on energy in raw data contributing to said second derivative.

14. The method as claimed in claim 1, further comprising applying one or more acceptability tests to batches of raw radar return data prior to processing said batches.

15. The method according to claim 14, wherein the acceptability test comprises comparing a contrast value for pixels in the raw radar return data with a threshold.

16. The method according to claim 1 wherein the step of determining a start of a next batch of radar return data comprises determining the start of the next batch of radar return data to be the end of the overlap region of the previous batch of raw radar return data, minus a normal overlap equal to a length needed to ensure that the valid data is contiguous, plus the determined chronological shift.

17. A storage medium encoded with computer readable instructions, wherein said instructions when executed configure a computer to perform the steps of:
    forming one or more batch images from batches of radar return data, said radar return data and batches of radar return data having a chronological order, wherein at least one batch image has a valid region abutted to a valid region of another batch image and an overlap region overlapped with an overlap region of another batch image;
    for one or more batches of radar return data, performing the steps of:
        determining an estimated first derivative of a phase error in a batch image, substantially at an end of the valid region;
        determining a chronological shift corresponding to said first derivative at an end of the valid region; and
        determining a start of a next batch of radar return data dependent on said chronological shift.

18. A radar apparatus to process batches of radar return data, said radar return data and batches of radar return data having a chronological order, the radar apparatus comprising:
    an image processing circuit to form one or more batch images from the batches of radar return data, wherein at least one batch image has a valid region abutted to a valid region of another batch image and an overlap region overlapped with an overlap region of another batch image;
    an image analysis circuit to determine an estimated first derivative of a phase error in a batch image, substantially at an end of the valid region;
    a time analysis circuit to determine a chronological shift corresponding to said first derivative at an end of the valid region; and
    a triggering circuit to determine a start of a next batch of radar return data dependent on said chronological shift.

19. A computer apparatus operable to perform strip-map synthetic aperture radar auto-focus image generation, comprising:
    a processor coupled to a memory,
    wherein the processor is programmed to generate an auto-focused strip-map synthetic aperture radar image from batches of radar return data, said radar return data and batches of radar return data having a chronological order, by performing the steps of:
        forming one or more batch images from the batches of radar return data, wherein at least one batch image has a valid region abutted to a valid region of another batch image and an overlap region overlapped with an overlap region of another batch image;
    for one or more batches of radar return data, performing the steps of:
        determining an estimated first derivative of a phase error in a batch image, substantially at an end of the valid region;
        determining a chronological shift corresponding to said first derivative at an end of the valid region; and
        determining a start of a next batch of radar return data dependent on said chronological shift.

* * * * *